(No Model.)
F. H. GASSEID.
JOURNAL BOX.
No. 590,434. Patented Sept. 21, 1897.
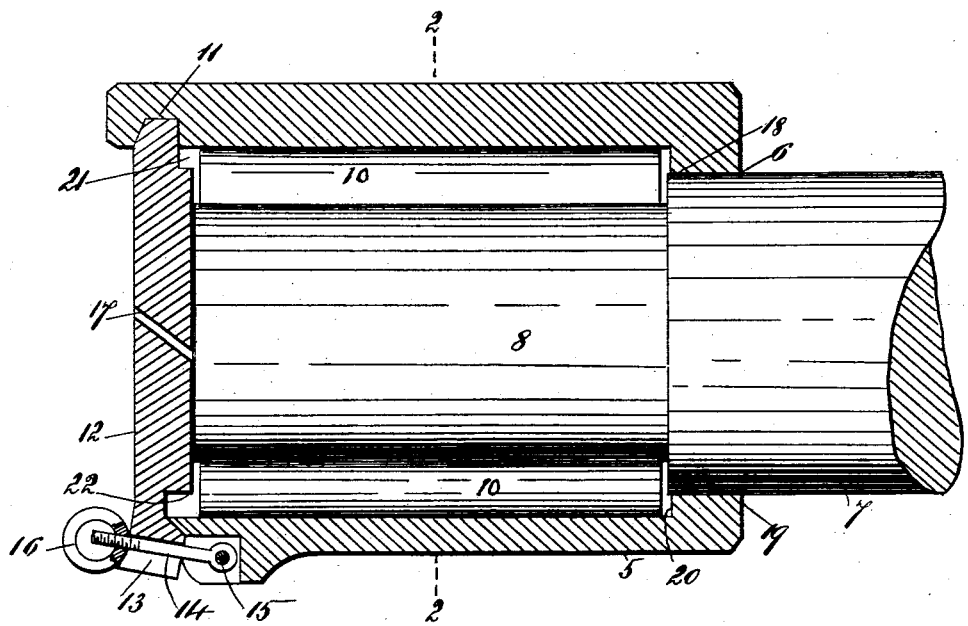
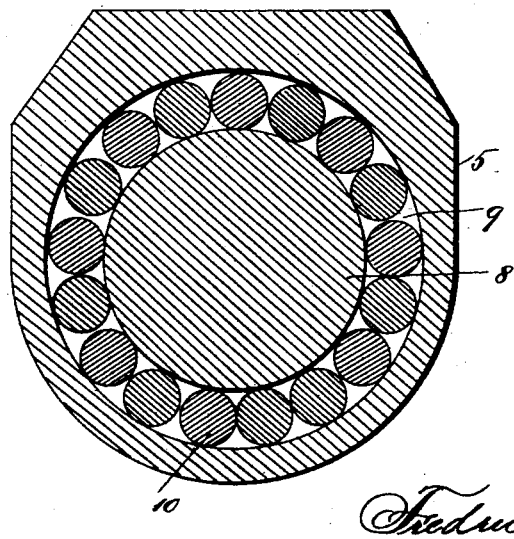
WITNESSES:
John Buckler,
C. Gerst
INVENTOR
Fredrick H. Gasseid.
BY
Edgar Tate
ATTORNEYS.
THE NORRIS PETERS CO., PHOTO-LITHO., WASHINGTON, D. C.

UNITED STATES PATENT OFFICE.

FREDRICK HERMAN GASSEID, OF BROOKLYN, NEW YORK.

JOURNAL-BOX.

SPECIFICATION forming part of Letters Patent No. 590,434, dated September 21, 1897.

Application filed April 6, 1897. Serial No. 630,946. (No model.)

*To all whom it may concern:*

Be it known that I, FREDRICK HERMAN GASSEID, a citizen of the United States, residing at Brooklyn, in the county of Kings and State of New York, have invented certain new and useful Improvements in Journal Boxes or Bearings, of which the following is a full and complete specification, such as will enable those skilled in the art to which it appertains to make and use the same.

This invention relates to journal boxes or bearings for the axles of railway-cars; and the object thereof is to provide an improved journal box or bearing which is particularly adapted for use in connection with the axles of railway-cars, and which may also be used in connection with other vehicles or in connection with mechanical devices wherever journal boxes or bearings are required.

The invention is fully disclosed in the following specification, of which the accompanying drawings form a part, in which—

Figure 1 is a longitudinal section of my improved journal-box and showing also the end of a railway-car axle in full lines, and Fig. 2 a cross-section on the line 2 2 of Fig. 1.

In the drawings forming part of this specification the separate parts of my improvement are designated by the same numerals of reference in each of the views, and in the practice of my invention I provide a cylindrical journal-box 5, which is provided at one end with a circular opening 6, through which the shaft or axle 7 is passed, and the shaft or axle 7 is provided with a reduced cylindrical extension 8, which is of less diameter than the inner diameter of the journal-box 5, whereby an annular space 9 is formed between said journal box or bearing and the reduced extension 8 of the shaft or axle 7.

The annular space 9 between the reduced extension 8 and the inner walls of the journal-box is filled in with cylindrical bearings 10, which correspond in transverse diameter with the width of the space or chamber 9, and which are substantially of the same length as the reduced extension 8 of the shaft or axle 7, and these cylindrical bearings 10 operate in the manner of ball-bearings, as will be readily understood, the construction and arrangement being such that the shaft or axle and the cylindrical extension 8 thereof do not come in contact with the journal-box 5.

The outer end of the journal box or case is open, and the top and bottom thereof are projected, and the projection of the top is provided in its under side with a transverse groove or recess 11, and I also provide an end cap or cover 12, the upper side of which is adapted to enter said transverse groove or recess and the lower side of which is provided with a transverse opening 13, through which is passed a bolt 14, which is secured in the projecting portion of the lower side of the box or casing, as shown at 15, and the outer end of the bolt 14 is screw-threaded and provided with a nut or bur or similar device 16.

The cap or cover 12 is provided centrally with a downwardly-directed bore or passage 17, through which oil or other lubricants may be passed, if desired; but my improved bearing is so constructed that lubricants will not ordinarily be necessary, and if lubricants are at any time required they may be passed through the bore or passage in the cap or plate 12, or the journal-box may be provided with other means by which lubricants may be passed therethrough, as will be readily understood.

The reduced extension 8 of the axle 7 forms an annular shoulder 18, which has a depth of about one-half of the diameter of the cylindrical bearings, but may be much reduced in depth, and the journal-box 5 is provided with an inwardly-directed annular flange 19, and the opening 6 is formed in the inwardly-directed annular flange 19. The inner surface of the annular flange is not on a line with the surface of the annular shoulder 18, whereby an annular recess 20 is formed, and the object of this construction is to prevent friction on the ends of the cylindrical bearings 10, as the ends of the said cylindrical bearings will bear against the shoulder 18, but not against the inner surface of the flange 19, and I also cut away a portion of the cap or cover 12, forming an annular recess 21 and a shoulder 22, and the outer end of the cylindrical bearings will come in contact with the shoulder 22, thereby reducing the friction.

My improved journal box or bearing is simple in construction and operation, and is perfectly adapted to accomplish the result for which it is intended, and is also comparatively inexpensive.

Having fully described my invention, I claim as new and desire to secure by Letters Patent—

The combination of a journal-box 5, and axle 7, said journal-box having an annular flange 19, provided with a central circular opening through which the said axle is adapted to pass, said box having a recess 11 in the upper inner side of the outer end thereof, said axle having a reduced extension thereby forming an annular shoulder 18, the vertical surface of which is on a plane within the said annular flange 19, whereby an annular recess 20 is formed, a cap or cover 12 adapted to engage said recess 11, and means for holding the same in place said cap or cover being cut away adjacent to the outer edge thereof, whereby an annular recess 21 is formed, a plurality of rollers mounted upon said extension of the axle within said journal-box, and adapted to bear at the ends thereof upon the shoulder of said axle and upon the said end plate 12, whereby the said rollers are held in longitudinal position by the said shoulder on the axle and a portion of the said end plate adjacent to the cut-away portion, substantially as and for the purpose described.

In testimony that I claim the foregoing as my invention I have signed my name, in presence of the subscribing witnesses, this 5th day of April, 1897.

FREDRICK HERMAN GASSEID.

Witnesses:
C. GERST,
L. R. MAHONY.